United States Patent Office 3,449,823
Patented June 17, 1969

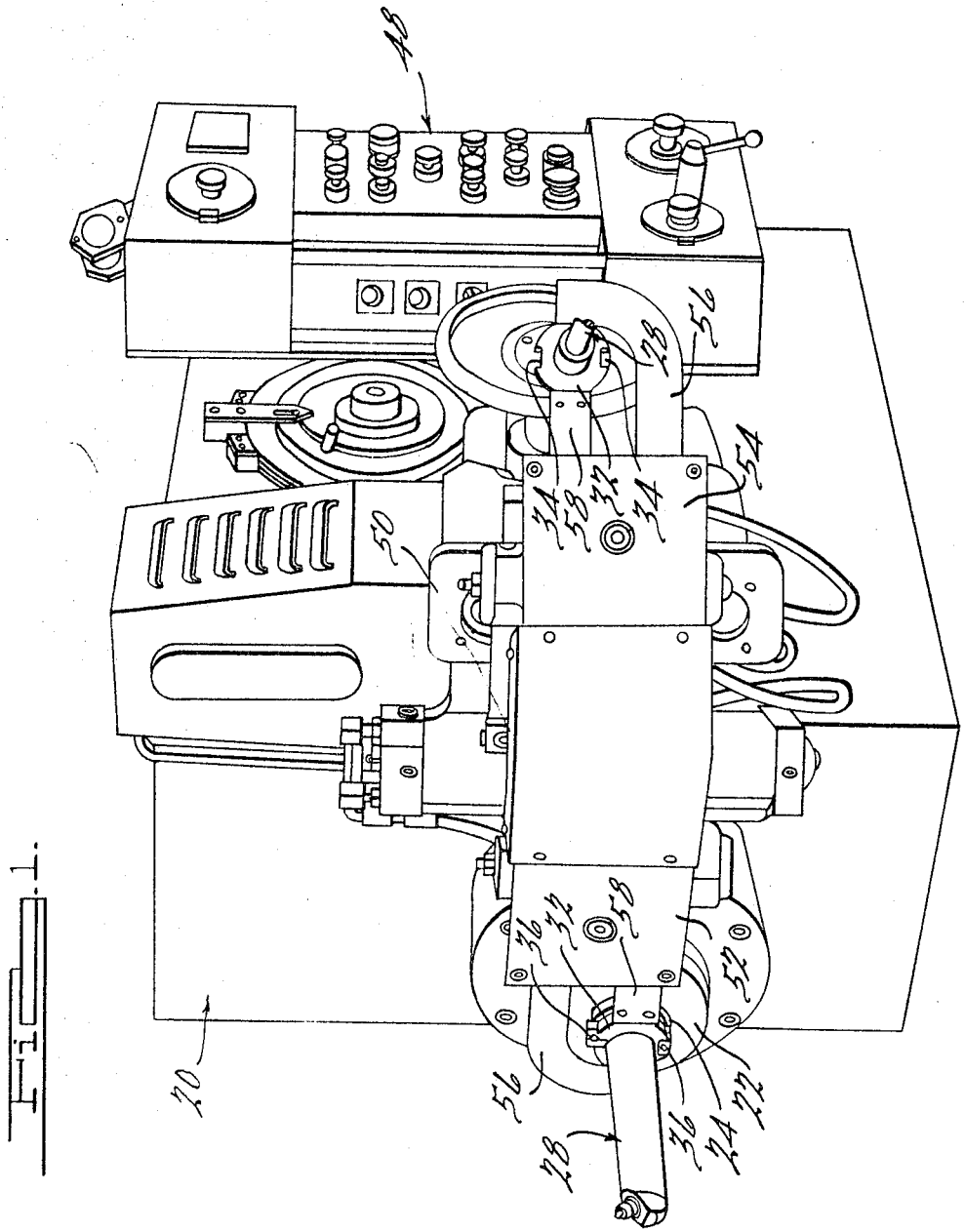

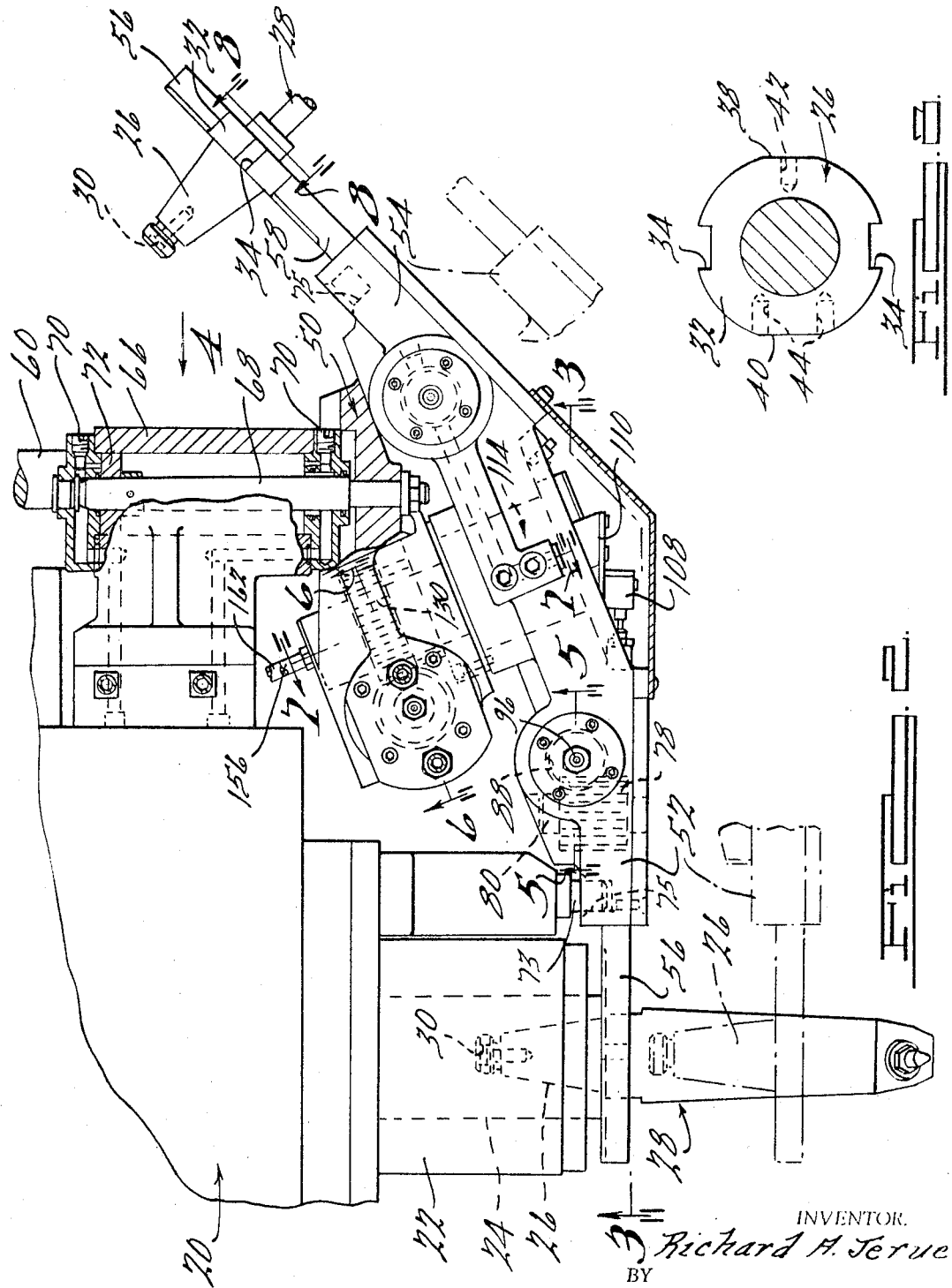

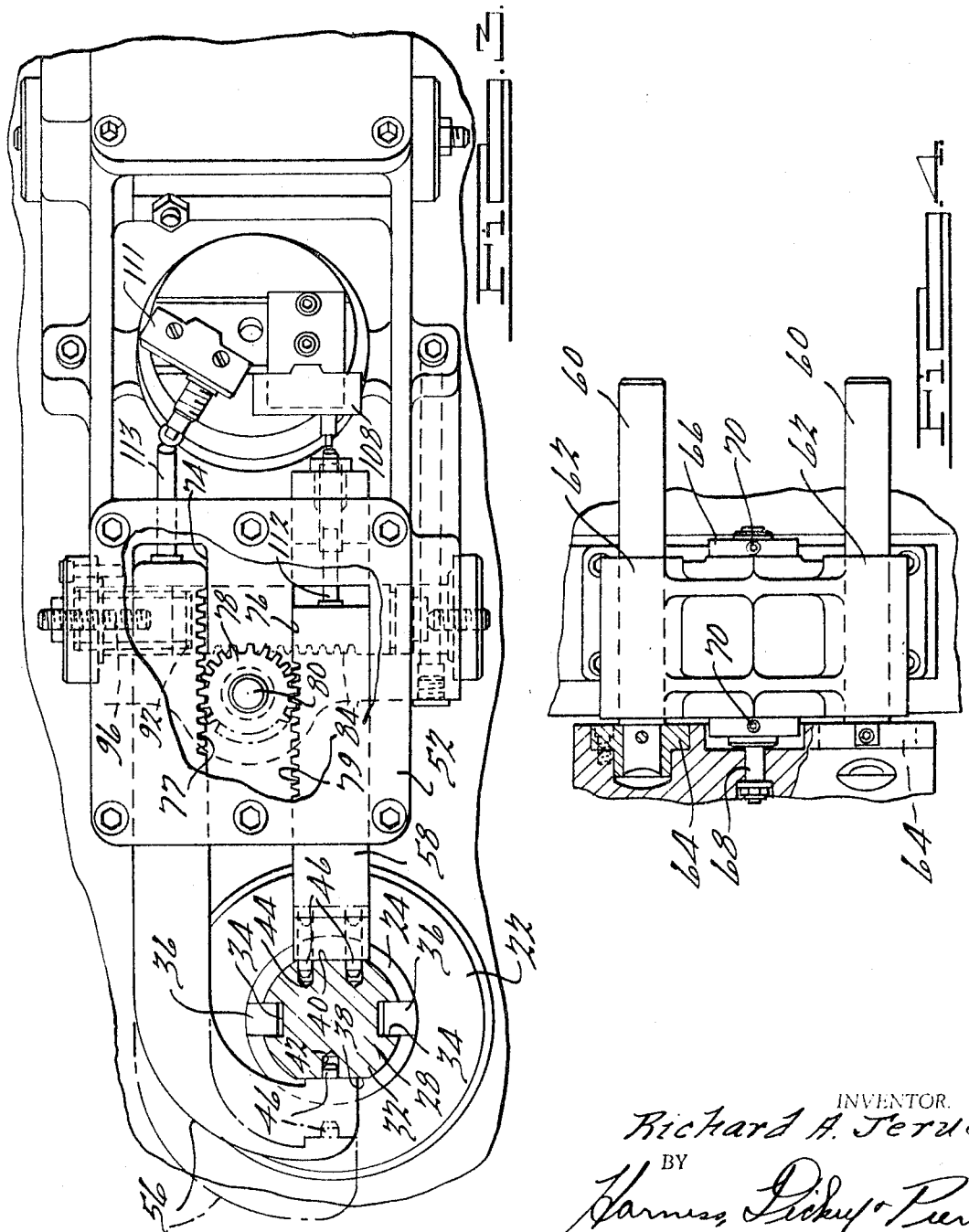

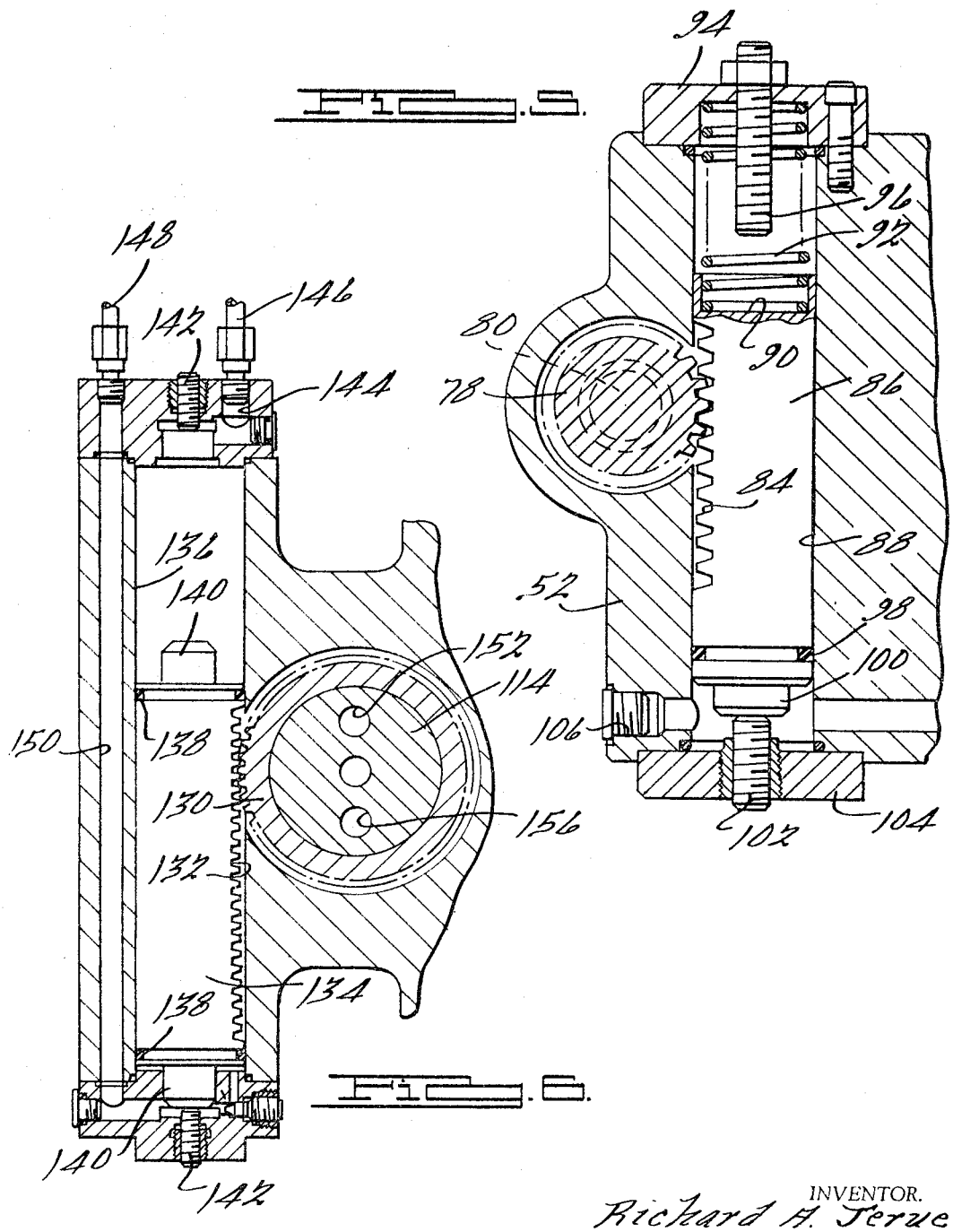

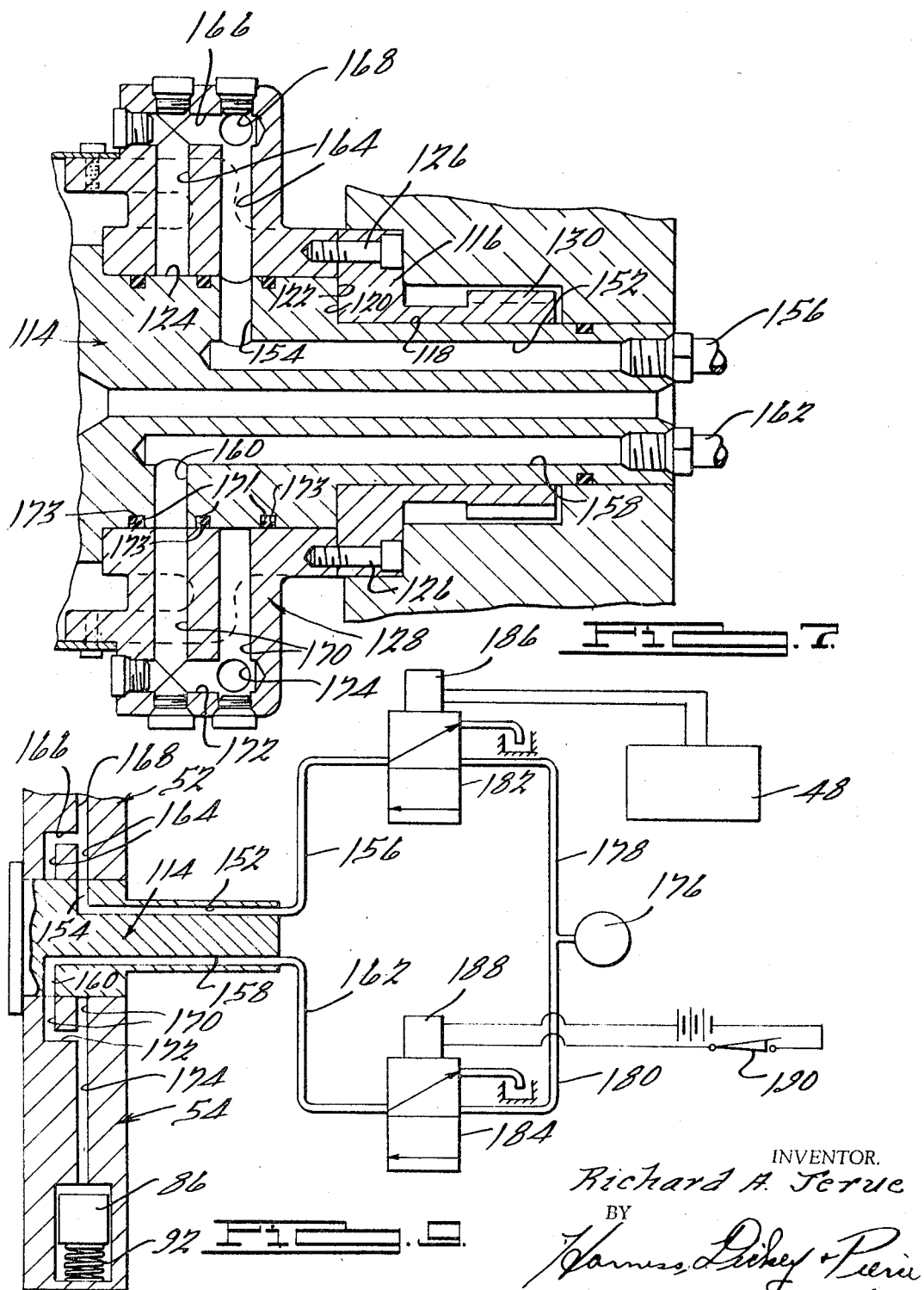

3,449,823
TOOL LOADING DEVICE FOR MACHINE TOOLS
Richard A. Jerue, Birmingham, Mich., assignor to De Vlieg Machine Company, a corporation of Michigan
Filed Oct. 2, 1967, Ser. No. 672,066
Int. Cl. B23q 3/00
U.S. Cl. 29—568                                    12 Claims

ABSTRACT OF THE DISCLOSURE

A tool changing mechanism for use on a machine tool having a rotatable spindle thereon which is adapted to removably receive and drivingly engage a tool for performing a work operation on a workpiece. The tool changer mechanism incorporates a plurality of arms having gripping means on the ends thereof for removably engaging a tool and for successively positioning a tool in alignment with the spindle and for engagement thereby to perform a series of selected work operations.

Background of the invention

A continuing problem associated with machine tools designed to automatically perform a series of sequentially programmed cutting operations on a workpiece has been the difficulty encountered in quickly and efficiently changing the cutting tools as required for performing the several work operations. In some instances the labor and time required for changing cutting tools is greater than that of the actual cutting operation performed and the associated machine downtime substantially detracts from the efficiency of the machine tool.

In accordane with the practice of the present invention an improved tool changer mechanism is provided which is compact and can readily be accommodated on the machine for successively transferring cutting tools into alignment with the machine tool spindle and thereafter extracting a cutting tool at the completion of a cutting operation and replacement thereof with the next cutting tool to be employed. The operation of the tool changer mechanism can also be readily coordinated with the automatic operating cycle of the machine tool providing for an integrated operation which substantially reduces labor requirements and machine downtime providing an increase in the operating efficiency of the machine tool.

Summary of the invention

The advantages and benefits of the present invention are achieved by a tool changer mechanism which is applicable for use on a machine tool having a spindle thereon which is adapted to removably receive and drivingly engage a cutting tool and for guiding the cutting tool during the performance of a cutting operation on a workpiece. The tool changer or loader mechanism comprises a framework having a plurality of arms thereon which extend in a substantially radial direction and are formed with gripping devices on the ends thereof for removably engaging a cutting tool. The framework is axially reciprocable in a direction substantially parallel to the axis of the machine tool spindle for inserting and extracting a cutting tool from the spindle chuck. The framework is also rotatable about an axis angularly disposed with respect to the axis of reciprocation of the framework wherein the arms disposed out of alignment with the spindle are positioned in clearance relationship providing unobstructed access of the cutting tool to the workpiece being machined. The gripping device on the arm disposed in alignment with the spindle is adapted to be automatically actuated for releasing and subsequently re-engaging a cutting tool at the completion of a cutting operation, whereas the gripping device on the remaining arms which are disposed in a so called "ready position" are independently actuable for removing and reloading cutting tools thereon in accordance with a preselected machining cycle. Suitable indexing means are incorporated on the framework for successively rotating the arms while the framework is in a projected position in order to place the next cutting tool in alignment with and for engagement by the machine tool spindle.

Other advantages and benefits of the present invention will become apparent from a reading of the description of the preferred embodiments of the invention taken in conjunction with the accompanying drawings.

Description of the drawings

FIGURE 1 is a perspective view of the head of a typical machine tool to which the tool changer mechanism comprising the present invention is applicable;

FIGURE 2 is a plan view partly in section fragmentarily illustrating a portion of the head of the machine tool and the tool changer mounted thereon;

FIGURE 3 is a transverse sectional view of the tool changer shown in FIGURE 2 and taken substantially along the line 3—3 thereof;

FIGURE 4 is a fragmentary side elevational view partly in section of the reciprocable support for the tool changer framework shown in FIGURE 2 as viewed in the direction of the arrow indicated at 4;

FIGURE 5 is a transverse fragmentary sectional view of the actuating device for the gripper on one of the arms shown in FIGURE 2 and taken substantially along the line 5—5 thereof;

FIGURE 6 is a fragmentary sectional view of the indexing mechanism for rotating the framework of the tool changer as shown in FIGURE 2 and taken substantially along the line 6—6 thereof;

FIGURE 7 is a longitudinal sectional view through the pivot shaft about which the framework rotates illustrating the porting arrangement for supplying a pressurized fluid to the actuators for the grippers as shown in FIGURE 2 and taken substantially along the line 7—7 thereof;

FIGURE 8 is a magnified fragmentary sectional view of a typical cutting tool as shown in FIGURE 2 and taken substantially along the line 8—8 thereof, and FIGURE 9 is a schematic diagram of the hydraulic system for effecting independent actuation of the gripping devices on each of the arms of the tool changer mechanism.

Description of the preferred embodiments

Referring now in detail to the drawings and as may be best seen in FIGURES 1 and 2, a spindle head 20 which is of a type typically employed on a horizontal boring and milling machine is illustrated which conventionally is supported for vertical movement on a suitable column (not shown) of a machine frame which normally is provided with a suitable table for mounting a workpiece to be machined adjacent to the cutting tool rotatably supported on the spindle head. The spindle head 20 comprises a frame on which a spindle sleeve 22 is rotatably mounted in an axially fixed position. A spindle 24 is disposed in driven relationship with respect to the spindle sleeve and is axially movable outwardly thereof from a retracted position as shown in FIGURE 2, to a projected position axially spaced outwardly therefrom. The spindle 24 is adapted to removably receive and engage a shank 26 of a typical cutting tool 28, such as a boring bar illustrated in FIGURES 1 and 2, and the cutting tool 28 is secured within the spindle 24 by means of a customary draw bolt (not shown) which is adapted to be disposed in threaded engagement in a threaded bore 30 provided in the end of the shank 26 of the cutting tool.

The cutting tool 28 is provided with a radially extending flange 32 disposed in a plane substantially perpendicular to the shank 26, and which flange as best seen in FIGURES 3 and 8, is formed with a pair of diametrically disposed notches 34 which open outwardly of the periphery of the flange 32 and are adapted to be drivingly engaged by engaging fingers or drive keys 36 on the spindle 24. The periphery of the flange 32 is also provided with diametrically disposed flats 38, 40 which are disposed in substantially parallel relationship and are located intermediate of the notches 34. Disposed centrally of the flat 38 is a radial inwardly extending bore 42, while a pair of bores 44 extend inwardly in a direction substantially perpendicular to the surface of the flat 40. The bores 42 and 44 are adapted to be removably engaged by pins 46 on the gripping arms (FIGURE 3) in a manner and for the purposes as subsequently described. Connected to and projecting forwardly of the flange 32 is the cutting portion of the tool which may be varied in configuration as may be desired to meet a specific cutting operation. The forward portion of the tool, for example, may itself consist of a tool holder on which various other cutting tools can be supported or, alternatively, may comprise the cutting tool itself such as a boring bar, drill, etc.

The shank 26 and flange 32 portions of the cutting tool 28 are of a standard construction regardless of the specific type of cutting device affixed to the forward end thereof. This portion of the cutting tool is of a common type conventionally used in a number of machine tools, such as, for example, milling machines, horizontal boring machines, vertical turret lathes, vertical jig boring machines, and the like. Constructions of this type are in conformance with the specifications as established by the National Machine Tool Builders Association, with the exception that the periphery of the flange 32 is modified, as shown in the drawings, to incorporate the flats 38, 40 and the bores 42, 44. These modifications, however, render the cutting tool equally applicable for use in other machine tools which are not equipped with a tool changer mechanism of the type comprising the present invention.

Referring to FIGURE 1, the spindle head 20 incorporates suitable drive means therein for effecting a rotation of the spindle sleeve and spindle as well as axial reciprocation of the spindle 24 and the cutting tool mounted thereon. The spindle head also carries a suitable control panel 48 as indicated in FIGURE 1 as well as conventional controls for selectively providing manual or automatic operation of the spindle head as well as other components of the machine tool. The tool changer mechanism comprising the present invention is mounted directly on the spindle head and is movable therewith for successively feeding cutting tools to the spindle and for removal thereof at the completion of a machining operation and replacement with the next cutting tool.

The tool changer mechanism, as exemplified in the specific embodiment illustrated in the drawings, consists of a framework 50 having a pair of diametrically disposed substantially radially extending arms 52, 54 mounted thereon, each of which incorporates at the end thereof a gripping device consisting of an outer gripper arm 56 and an inner gripper arm 58, as best seen in FIGURE 3. The entire framework 50 is mounted on the spindle head frame for reciprocation to and from a retracted position as shown in solid lines in FIGURE 2 to a projected position as fragmentarily shown in phantom. The length of the reciprocating travel of the tool changer mechanism between the retracted and projected positions is controlled so as to effect a withdrawal of the shank 26 outwardly and in clearance relationship beyond the end of the spindle 24, as best seen in FIGURE 2, to enable rotary movement of the cutting tool relative to the spindle sleeve. Guided reciprocatory movement of the tool changer mechanism is achieved, as best seen in FIGURES 2 and 4, by a pair of guide rods 60 slidably disposed in guided bearing contact within bosses 62 rigidly secured to the frame of the spindle head. The ends of the guide rods 60 are securely fastened to stepped collars 64 which in turn are securely fastened to the framework 50 of the tool changer mechanism.

Reciprocation of the tool changer mechanism between the retracted and projected positions is achieved by means of a double acting fluid actuated cylinder 66, as best seen in FIGURES 2 and 4, which is mounted between the guide rods 60 on the frame of the spindle head, and with the end of its piston rod 68 affixed to the framework of the tool changer mechanism. The cylinder 66 is provided with ports 70 at opposite ends thereof into which a pressurized fluid, such as a hydraulic fluid, is selectively admitted to effect a reciprocation of the piston rod 68 and the piston 72 slidably disposed in sealing engagement within the cylinder 66. The actuation of the cylinder 66 and the admission of pressurized fluid into one end thereof is controlled in accordance with the operating cycle of the machine tool and with the gripping devices on the tool changer so as to effected an extraction of a cutting tool from the spindle and subsequently a replacement of a cutting tool when disposed in alignment with the spindle while in a projected position. In accordance with the foregoing construction, reciprocation of the entire framework and tool changer mechanism occurs in a direction substantially parallel to the axis of rotation of the spindle 24. Alignment of the arm at the load station is further facilitated by a chamfered aligning pin 73 affixed to the frame adjacent to the spindle sleeve 22 as shown in FIGURE 2, which is engageable with a chamfered bore 75 provided in each arm 52, 54. This interlocking relation also prevents inadvertent angular movement of the arms when in the retracted position.

In the exemplary embodiment as illustrated in the drawings, the tool changer mechanism incorporates two arms 52, 54, which are disposed at substantially 180° from each other and wherein the arm 52, as shown in FIGURES 1 and 2, is in a so-called "active or load station," while the arm 54 is shown in a so-called "ready station" in which cutting tools can be loaded and unloaded therefrom. The actuation of the outer gripper arm 56 and the inner gripper arm 58 at the end of each of the arms 52, 54 is substantially identical, and a detailed description of one gripping device will suffice for a complete understanding of the present invention.

As may be best seen in FIGURES 3 and 5, the outer gripper arm 56 is slidably supported in a way 74, while the inner gripper arm 58 is slidably supported in a way 76 disposed substantially parallel to the way 74. The opposed side edge surfaces of each of the gripper arms are provided with a series of teeth defining racks 77, 79 which are disposed in constant meshing relationship with one end portion of an elongated pinion gear 78 rotatably mounted on a cross shaft 80. The other end portion of the pinion gear 78, as best seen in FIGURE 5, is disposed in constant meshing relationship with a rack 84 formed along one side of a piston 86 which is slidably disposed within a cylindrical bore 88 of the arm 52 of the tool changer mechanism. The upper end of the piston 86, as viewed in FIGURE 5, is provided with a recess 90 in which a helical coil spring 92 is seated and has its upper end seated within an end cap 94 for biasing the piston in a downward direction. The end cap 94 also incorporates a stop screw 96 projecting axially of the cylindrical bore 88 for restricting the upward travel of the piston beyond a preselected point.

The opposite end of the piston 86 is provided with an O-ring seal 98 extending around the periphery thereof, and a cylindrical abutment 100 projects axially from the end thereof and is adapted to contact a stop screw 102 adjustably affixed in an end cap 104 for restricting the reciprocating travel of the piston 86 belond a preselected point. A port 106 is formed in the arm 52 which is disposed in communication with the lower end surface of the piston 86 for supplying a pressurized fluid, such as a hydraulic fluid, to effect movement of the piston from the position as shown in FIGURE 5 in opposition to the biasing force of the coil spring 92 to a position where its end is disposed in abutting contact against the stop screw 96. During the course of travel of the piston 86 from the position as shown in FIGURE 5 to a position wherein its end contacts the stop screw 96, the coaction between the rack 84 and the pinion 78 effects a corresponding reciprocation of the gripper arms, as shown in FIGURE 3, whereupon the outer gripper arm 56 and inner gripper arm 58 are moved in opposite directions and in substantially parallel relationship such that the pins 46 thereon are withdrawn from the engaging bores 42, 44 around the flange of the cutting tool and are retracted to a position as shown in phantom in which they are disposed in relative clearance relationship with respect to the spindle 24 and the engaging drive keys 36 thereon.

Upon a release of the hydraulic pressure within the cylinder, the coil spring 92 effects a return movement of the piston 86 whereupon the pinion gear 78, as shown in FIGURE 5, is again oscillated effecting a corresponding reciprocation of the gripper arms, as shown in FIGURE 3, whereupon the outer gripper arm and inner gripper arm are moved in opposite parallel directions such that the pins 46 thereon are again disposed in engaging relationship within the bores 42, 44 around the periphery of the flange of the cutting tool. The foregoing arrangement provides the advantage that in the event of inadvertent loss of fluid pressure, the gripper arms will remain in an engaging position thereby preventing inadvertent droppage of a tool carried thereby.

When in the engaged position, as best seen in FIGURE 3, the flat end surfaces on the outer and inner gripper arms from which the engaging pins 46 project conformably engage the flat surfaces 38, 40 on the periphery of the flange 32 of the cutting tool. It will be further noted that the projecting length of the pins 46 is less than the depth of the bores 42, 44 and the ends of the pins are preferably provided with a taper to facilitate alignment and engagement of the gripping arms with the tool.

In order to further coordinate the position of the gripper arms with the operating cycle of the machine tool, a suitable sensing device such as a limit switch 108, as best seen in FIGURES 2 and 3, is mounted on a rotationally fixed plate 110 and which is adapted to be actuated by an actuator pin 112 affixed to the end of the inner gripper arm 58 disposed at the load station when in an opened position. Similarly, a limit switch 111 is preferably provided as shown in FIGURE 3 which is adapted to be tripped by an actuator pin 113 affixed to the end of the outer gripper arm 56 disposed at the load station when in a closed position. The limit switches 108, 111 are electrically connected to the control circuit of the machine tool and are interlocked therewith to assure that the gripper arms are in the appropriate position before the next operating step of the tool transfer mechanism and machine tool commences.

The arms 52, 54 and the gripping devices thereon are rotatable through an angularity of 180° in order to transfer a cutting tool disposed at the ready station into alignment with the spindle from which the previous tool has been extracted and removed by the arm 52. In order to achieve this, the arms 52, 54 are rotatably supported on a ported stepped shaft 114, as may be best seen in FIGURES 2, 6 and 7, which is stationarily retained on the framework 50 of the tool changer mechanism. As will be noted from the relationship as illustrated in FIGURE 2, the axis of the stepped shaft 114, which corresponds to the axis of rotation of the arms, is angularly offset with respect to the axis of reciprocatory movement of the tool changer framework and the longitudinal axis of the spindle. Similarly, each of the arms 52, 54 are angularly offset with respect to a plane disposed perpendicular to the axis of the stepped shaft at an angle substantially equal to the angular offset of the axis of the stepped shaft and the axis of reciprocatory movement of the tool changer. By virtue of this construction the arm at the ready station, such as the arm 54 shown in FIGURE 2, is disposed at an angularly offset position relative to the forward end of the spindle providing for unobstructed clearance of the tool forwardly of the tool changer mechanism. It will also be apparent that the offset position of the arm 54, as viewed in FIGURE 2, enables manual or automatic replacement of the cutting tool without any interference with a workpiece disposed on a suitable support table positioned forwardly of the spindle on the tool head. It will also be noted by virtue of the foregoing relationship that the axis of the tapered shank of the cutting tool, when in the ready position, is angularly disposed relative to the axis of reciprocation of the tool changer framework in an amount equal substantially to twice the angle of offset of the axis of rotation of the arms with respect to the reciprocatory axis. On the other hand, the axis of the shank of the cutting tool, when disposed in the load position, is in alignment with the axis of the spindle.

A flanged collar 116, as best seen in FIGURE 7, is rotatably supported on the reduced diameter 118 of the stepped shaft and is disposed with its end surface 120 in bearing contact against a shoulder surface 122 formed between the reduced diameter 118 and an enlarged diameter 124 of the stepped shaft. A plurality of circumferentially spaced screws 126 rigidly secure the flange collar 116 to a hub 128 to which the arm 52, 54 are connected.

The oscillation of the hub 128 about the enlarged diameter 124 is achieved by the driving coaction of the flange collar 116 through the driving connection of the screws 126 in response to the coaction of a pinion gear 130 integrally formed adjacent to the end of the flanged collar, which is adapted to be disposed in constant meshing engagement with a rack 132 formed on a piston 134, as best seen in FIGURE 6. The piston 134 is slidably disposed within a cylindrical bore 136 and is sealingly retained therein by means of O-ring seals 138 provided adjacent to each end thereof. A cylindrical projection 140 extends centrally and axially from each end of the piston 134 and is adapted to abut against the shank end portions of stop screws 142 disposed at each end of the cylindrical bore 136 to restrict the reciprocating travel of the piston. A suitable pressurized fluid is admitted into the upper end of the cylindrical bore 136, as viewed in FIGURE 6, through a port 144 provided with a supply conduit 146, while in a similar manner pressurized fluid is admitted from a supply conduit 148 disposed in communication with a longitudinally extending port 150 which is disposed in communication with the lower end portion of the cylindrical bore 136. Accordingly, by controlling the supply and venting of hydraulic fluid from the conduits 146, 148, appropriate reciprocation of the piston 134 is achieved with a corresponding oscillation of the pinion gear 130 and the hub 128 affixed thereto, whereby the arms 52, 54 and the cutting tools supported by the gripping mechanisms at the ends thereof are moved to and from the ready position and the loading position in alignment with the end of the spindle as shown in FIGURE 2. Proper axial alignment of the shank 26 with the spindle 24 is achieved by appropriate adjustment of the stop screws 142 at the ends of the cylindrical bore 136 (FIGURE 6).

The stepped shaft 114 and the hub 128 are provided with suitable ports therethrough, as shown in FIGURES 7 and as diagrammatically illustrated in FIGURE 9, in order that the supply of pressurized fluid to the gripping mechanism of the arm in the loading position is supplied from one control source and is automatically transferred to another control source when that arm is returned to the ready position. The foregoing is achieved by the provision of a longitudinally extending port 152 in the stepped shaft which terminates in a radially extending port 154 and which is connected to a supply conduit 156. A second longitudinally extending port 158 terminating in a radially extending port 160 is connected to a supply conduit 162.

The radially extending ports 154 and 160 extend in substantially diametrically opposite directions and are axially offset and oriented so as to communicate with ports formed in the hub when the arms are disposed in the ready position and load position or vice versa. The hub, as shown in FIGURE 7, is formed with a pair of substantially parallel and radially extending ports 164 which are interconnected at their outer ends by a crossover port 166 and which in turn is disposed in communication with an outlet 168 that is adatped to be disposed in connection with the port 106 (FIGURE 5) of the actuating mechanism for the gripper arms. Similarly, a pair of ports 170 are disposed in parallel spaced relationship and extend axially and diametrically opposite to the ports 164 through the hub and are interconnected at their outer ends by a crossover port 172 which in turn is disposed in communication with an outlet port 174 which is adapted to be connected with the port 106 (FIGURE 5) of the actuator for the gripping arms on the other arm of the tool changer mechanism. The several ports 164, 170, 154 and 160 are sealed within the hub and shaft 114 by means of a series of annular seals 171, disposed in annular grooves 173 extending around the enlarged diameter of the stepped shaft.

The foregoing relationship is diagrammatically illustrated in FIGURE 9 in which the arm 52 is schematically shown oriented in the load position in accordance with the relationship depicted in FIGURE 1, while the arm 54 is disposed in the ready position and in which latter instance the piston 86 of the gripping mechanism thereon is disposed in communication with the supply conduit 162. The gripping mechanism on the arm 52 is disposed in communication with the supply conduit 156. It will be apparent that upon rotation of the arms through an interval of 180° the arm 54, as shown in FIGURE 9, will assume the position of that of the arm 52 and vice versa and in which latter instance the respective actuating mechanisms of the gripping devices thereon will be disposed in controlled communication with the other of the supply conduits.

In accordance with the arrangement as illustrated in FIGURE 9, a suitable pressurized source of an actuating fluid, such as a hydraulic fluid, is supplied from a pump 176 which in turn is conveyed through branch conduits 178, 180 to the inlet side of solenoid valves 182 and 184, respectively. The solenoid valve 182 controls the flow of fluid from the pump through the branch conduit 178 to the supply conduit 156, which is disposed in communication with the gripping mechanism of the arm in the load position. The actuation of a suitable coil 186 on the solenoid valve 182 can be achieved in accordance with the programmed operating cycle of the machine tool as incorporated in the control panel 48, which may be of any of the types well known in the art including computerized and programmed operating cycles. The coil 188 operatively associated with the solenoid valve 184 in turn may also be connected to the control panel 48 in such instances when an automatic tool loading and unloading device is provided at the ready station or, alternatively, as diagrammatically illustrated in FIGURE 9, can be manually controlled by means of a suitable switch 190 which may be foot actuated by the machine tool operator.

The solenoid valves 182, 184 are normally disposed in a venting position in which the biasing pressure of the spring 92 against the piston 86, as shown in FIGURES 9 and 5, is operative to retain the outer and inner gripping arms in an engaged position around the flange of a cutting tool. Upon energization of the solenoid valves, pressurized fluid is directed through the supply conduits effecting a movement of the pistons 86 in opposition to the biasing resistance of the return springs 92 effecting an opening of the inner and outer gripping arms and a release of the tool. When the arm is in the load position, the release of the tool and movement of the gripper arms to a clearance position enables axial advancement of the spindle and cutting tool to perform a work operation. The opening of the gripper arms at the ready station, on the other hand, enables removal of the tool and replacement thereof with the next cutting tool to be employed in the machining cycle.

In operation of the tool handling mechanism comprising the present invention, and with the arms and cutting tools oriented as shown in FIGURES 1 and 2, a cutting operation is performed by the cutting tool 28 drivingly coupled to the spindle at the completion of which the spindle again is retracted, and rotation of the spindle is stopped such that the flats along the flange of the tool are disposed opposite to the ends of the abutting surfaces of the outer and inner gripping arms, as shown in FIGURE 3. The control system or other manual actuation thereafter effects a release of hydraulic fluid to the gripper arm actuating mechanism enabling the biasing force of the coil spring 92 (FIGURE 5) to effect a closing of the gripper arms and an engagement of the cutting tool is signalled by the tripping of limit switch 111 (FIGURE 3). Upon a signalling to the control circuit that the cutting tool has been properly engaged at the load station, the draw bolt is withdrawn from the tapped bore 30 in the end of the shank 26 of the cutting tool, and energization of the cylinder 66 occurs. Accordingly, the tool changer mechanism is moved from a retracted position, as shown in solid lines in FIGURE 2, to a projected position as shown in phantom wherein the cutting tool 28 is withdrawn outwardly of the end of the spindle 24, and at the completion of the projecting travel the indexing mechanism (FIGURE 6) is energized to effect a reciprocation of the piston 134 and a corresponding rotation of the arms 52, 54 through an arcuate increment of approximately 180° such that the cutting tool retained on the arm 54 is now disposed in alignment with the end of the spindle, and the cutting tool at the end of the arm 52 is disposed in the ready station. At the completion of the rotary movement of the tool handling mechanism, the cylinder 66 is again actuated effecting movement of the framework of the tool changer mechanism from the projected position to the retracted position, and during which movement the shank 26 of the cutting tool is inserted into the spindle. The draw bolt is again tightened, and the solenoid valve 182 (FIGURE 9) is again actuated whereby pressurized fluid is supplied to the gripping arm actuator mechanism effecting an opening of the gripping arms and a release of the cutting tool. The spindle thereafter is free to rotate and reciprocate axially for performing the planned machining operation on a workpiece.

During the interim, the arm 52, which is now disposed at the ready station, can be actuated such as by depressing the switch 190 (FIGURE 9) whereby the solenoid valve 184 effects a supply of pressurized fluid to the gripper arm actuating mechanism thereon enabling a release of the cutting tool retained thereby. The cutting tool can be removed by an operator or, alternatively, by a mechanical tool loading and unloading device, and a new cutting tool can be placed in alignment with the engaging pins on the gripping arms after which the switch 190 (FIGURE 9) is released whereupon the gripping arms engage the newly installed cutting tool. Accordingly, the new cutting tool remains in the ready position until the cutting operation is completed whereafter the machine tool and tool changer mechanism undergoes a tool change cycle in accordance with the cycle as previously described.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a machine having a frame and a spindle thereon adapted to removably receive and drivingly engage a tool for performing a work operation, the improvement comprising a tool changer mechanism for successively transferring tools to and from the spindle, said mechanism comprising a framework, a plurality of arms on said framework extending in a substantially radial direction, gripping means on each of said arms for engaging a tool, means for reciprocating said framework in a direction substantially parallel to the axis of said spindle to and from a projected position and a retracted position, mounting means for mounting said framework for rotation about an axis angularly disposed with respect to the axis of reciprocation of said framework, indexing means for rotating said framework when in said projected position for successively positioning a tool on one of said arms in axial alignment with the spindle, and actuating means for actuating said gripping means to disengage and thereafter reengage a tool carried by the spindle when said framework is in said retracted position.

2. The tool changer mechanism as defined in claim 1 in which said framework incorporates two of said arms disposed in diametrically disposed relationship.

3. The tool changer mechanism as defined in claim 1, wherein each of said arms is angularly offset from a plane disposed perpendicular to said axis of rotation of said framework at an angle corresponding substantially to said angularity of said axis of rotation relative to the direction of reciprocation of said framework.

4. The tool changer mechanism as defined in claim 1, wherein said axis of said spindle and said axis of rotation of said framework are disposed in a common plane.

5. The tool changer mechanism as defined in claim 1, wherein the operation of said actuating means is coordinated with the operating cycle of the machine.

6. The tool changer mechanism as defined in claim 1, wherein said gripping means on each of said arms is operable indepedently of the other.

7. The tool changer mechanism as defined in claim 2, wherein said indexing means comprises a rack and pinion drive for oscillating said arms through arcuate increments of substantially 180°.

8. The tool changer mechanism as defined in claim 1, wherein said gripping means on one of said arms disposed in alignment with said spindle is automatically connected to one control source while said gripping means on the remaining said arms are automatically connected to an alternative control source for effecting actuation thereof.

9. The total changer mechanism as defined in claim 1, wherein sensing means are provided for sensing the position of said gripping means on one of said arms in alignment with the spindle.

10. The tool changer as defined in claim 1 further including cooperating means on the frame of the machine and on said arms operable when said framework is in said retracted position to prevent inadvertent rotary movement of said one of said arms disposed in alignment with said spindle.

11. In a machine having a frame and a spindle thereon adapted to removably receive and drivingly engage a tool for performing a work operation, the improvement comprising a tool changer mechanism for successively transferring tools to and from the spindle, said mechanism comprising a framework, a plurality of arms on said framework extending in a substantially radial direction, gripping means on each of said arms for engaging a tool, means for reciprocating said framework to and from a projected position and a retracted position, mounting means for rotatably mounting said arms, indexing means for rotating each of said arms to and from a load position adjacent to the spindle to a ready position angularly spaced therefrom, actuating means for independently actuating said gripping means on each of said arms for engaging and disengaging a tool carried thereby, and energizing means selectively connectible to said actuating means for each of said gripping means in accordance with the angular rotated position of each of said arms for effecting selected independent actuation of said gripping means thereon.

12. The tool changer as defined in claim 11, wherein said mounting means comprise a shaft formed with ports therethrough, and each of said arms is formed with ports therein which are selectively communicable with said ports in said shaft in accordance with said angular rotated position of each of said arms for selectively connecting said actuating means for said gripping means to an independent source of pressurized actuating fluid.

References Cited

UNITED STATES PATENTS

| | | | |
|---|---|---|---|
| 3,276,116 | 10/1966 | Stark | 29—568 |
| 3,233,321 | 2/1966 | Anthony | 29—568 |
| 3,327,386 | 6/1967 | Jerue | 29—568 |
| 3,217,406 | 11/1965 | Dever | 29—568 |

RICHARD H. EANES, JR., *Primary Examiner.*